United States Patent
Yano (10) Patent No.: US 8,432,478 B2
(45) Date of Patent: Apr. 30, 2013

(54) IMAGE-TAKING APPARATUS INCLUDING LENS APPARATUS OPERABLE BETWEEN HOUSED STATE AND IMAGE-TAKING STATE

(75) Inventor: Yukiteru Yano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 780 days.

(21) Appl. No.: 11/086,707

(22) Filed: Mar. 22, 2005

(65) Prior Publication Data

US 2005/0207744 A1 Sep. 22, 2005

(30) Foreign Application Priority Data

Mar. 22, 2004 (JP) ................................. 2004-083736

(51) Int. Cl.
*G03B 13/00* (2006.01)
*G03B 17/00* (2006.01)

(52) U.S. Cl.
USPC ............................................ 348/357; 396/75

(58) Field of Classification Search .................. 348/335, 348/240.99, 357, 355; 359/694–700; 396/349, 396/85, 133, 72
See application file for complete search history.

(56) References Cited

U.S. PATENT DOCUMENTS

| | | | | |
|---|---|---|---|---|
| 4,448,496 A | * | 5/1984 | Isobe et al. | ..................... 359/705 |
| 5,153,626 A | * | 10/1992 | Yamamoto | ..................... 396/349 |
| 5,398,132 A | | 3/1995 | Otani | |
| 6,091,552 A | * | 7/2000 | Ueyama | ..................... 359/694 |
| 6,836,669 B2 | | 12/2004 | Miyake et al. | |
| 7,308,195 B2 | * | 12/2007 | Yumiki et al. | ..................... 396/75 |
| 2002/0034148 A1 | * | 3/2002 | Yamamoto et al. | ...... 369/112.24 |
| 2004/0042775 A1 | * | 3/2004 | Nomura | ..................... 396/73 |
| 2006/0034594 A1 | * | 2/2006 | Yumiki et al. | ..................... 396/72 |

FOREIGN PATENT DOCUMENTS

| | | |
|---|---|---|
| CN | 1306660 A | 8/2001 |
| CN | 1356842 A | 7/2002 |
| JP | 05-100280 | 4/1993 |
| JP | 05-150152 | 6/1993 |
| JP | 08-095143 A | 4/1996 |
| JP | 09-189837 A | 7/1997 |
| JP | 10-003103 | 1/1998 |
| JP | 10-164417 A | 6/1998 |
| JP | 10-197775 | 7/1998 |
| JP | 2003-098418 A | 4/2003 |
| WO | WO 00/46800 | 8/2000 |

* cited by examiner

*Primary Examiner* — Roberto Velez
*Assistant Examiner* — Joel Fosselman
(74) *Attorney, Agent, or Firm* — Cowan, Liebowitz & Latman, P.C.

(57) ABSTRACT

A lens apparatus is disclosed, which can control the position of a lens unit driven by an actuator such as a vicecoil motor in a non-energizing state of the actuator easily. The lens apparatus comprises: a first lens unit and second lens unit moving in an optical axis direction, respectively; a first actuator driving the first lens unit; and a second actuator driving the second lens unit. The first lens unit is driven by the second lens unit that is driven by the second actuator in a nonenergized state of the first actuator, and a member is provided in one of the first and second lens units. The member contacts the other lens unit in the nonenergized state.

6 Claims, 11 Drawing Sheets

IMAGE-TAKING APPARATUS INCLUDING LENS APPARATUS OPERABLE BETWEEN HOUSED STATE AND IMAGE-TAKING STATE

FIELD OF THE INVENTION

The present invention relates to a lens apparatus used for an image-taking apparatus such as a digital camera and video camera.

BACKGROUND OF THE INVENTION

A collapsible lens barrel is used in an image-taking apparatus such as a digital still camera. The collapsible lens barrel changes its length in an image-taking state in which the distance between a plurality of lens units changes to perform zooming and focusing, and in a housed (collapsed) state in which the distance between the plurality of lens units and the distance from between the plurality of lens units to an image-pickup plane reduce to a predetermined distance. Such a collapsible lens barrel is driven by a driving mechanism such as a cam and a helicoid gear.

Miniaturization of the lens barrel is required with miniaturization of the image-taking apparatus, and quiet drive of the lens barrel is required for reduction of the volume and weight of the lens barrel. For this purpose, in Japanese Patent Laid-Open Application No. H05-150152, a lens driving mechanism is disclosed, in which a lens unit is driven in the optical axis direction thereof by a voicecoil motor including a magnet arranged around the lens unit, and a coil and yoke arranged around the magnet.

However, since a voicecoil motor does not have a stable stop position (for example, a magnetic stable position in a stepping motor) in a nonenergized state, the position of the lens unit driven by the voicecoil motor in the optical axis direction is not held in the nonenergized state such as a nonuse state of the image-taking apparatus. Therefore, there is a problem that the lens unit moves in its movable range in the nonuse state.

When the lens unit having no stable stop position collides a mechanical end of the movable range, deterioration of the optical accuracy of the lens barrel and a collision sound will occur.

SUMMARY OF THE INVENTION

One object of the present invention is to provide a lens apparatus and an image-taking apparatus, which can control the position of a lens unit driven by an actuator such as a voicecoil motor in a nonenergized state of the actuator easily.

A lens apparatus that is one aspect of the present invention comprises: a first lens unit and second lens unit moving in an optical axis direction, respectively; a first actuator driving the first lens unit; and a second actuator driving the second lens unit. The first lens unit is driven by the second lens unit that is driven by the second actuator in the nonenergized state of the first actuator, and a member is provided in one of the first and second lens units. The member contacts the other lens unit in the nonenergized state.

A lens apparatus that is another aspect of the present invention comprises: a first lens unit, which moves in an optical axis direction; a second lens unit, which is located on an object side further than the first lens unit and moves in the optical axis direction; a first actuator, which drives the first lens unit; and a second actuator, which drives the second lens unit. The lens apparatus has a first state in which the first lens unit is driven in the optical axis direction by the first actuator at the time of image-taking, and a second state in which the first lens unit is driven in the optical axis direction by the second actuator in response to an instruction for stowing.

A lens apparatus that is still another aspect of the present invention comprises: a first lens unit, which moves in an optical axis direction; a second lens unit, which is located on an object side further than the first lens unit and moves in the optical axis direction; a first actuator, which drives the first lens unit; and a second actuator, which drives the second lens unit. The first lens unit is driven in the optical axis direction by the first actuator at the time of image-taking, and is driven in the optical axis direction by contacting the second lens unit in response to an instruction for stowing.

Other objects and further features of the present invention will become readily apparent from the following description of the preferred embodiments with reference to accompanying drawings

DETAILED DESCRIPTION OF THE PREFERRED EMBODIMENTS

A description will now be given of the preferred embodiments of the present invention by referring to the accompanying drawings.

Figure 1:
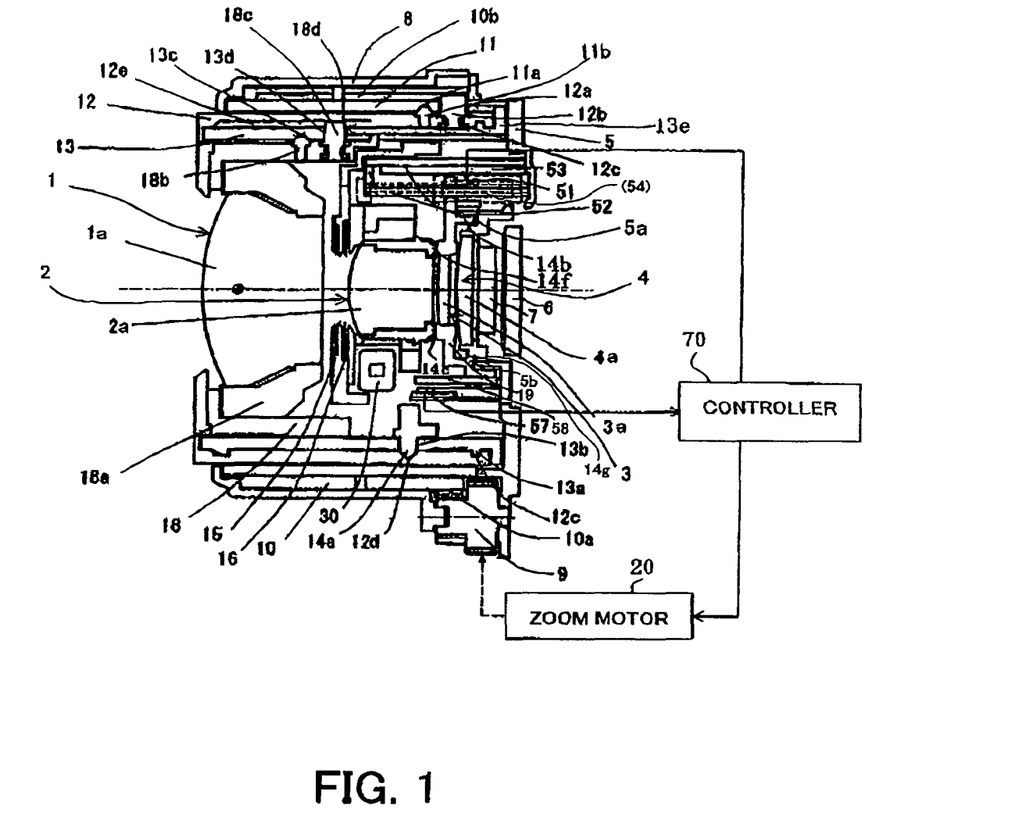
FIG. 1 is a sectional view showing the structure of a lens barrel that is an embodiment of the present invention in a collapsed state.
Figure 2:
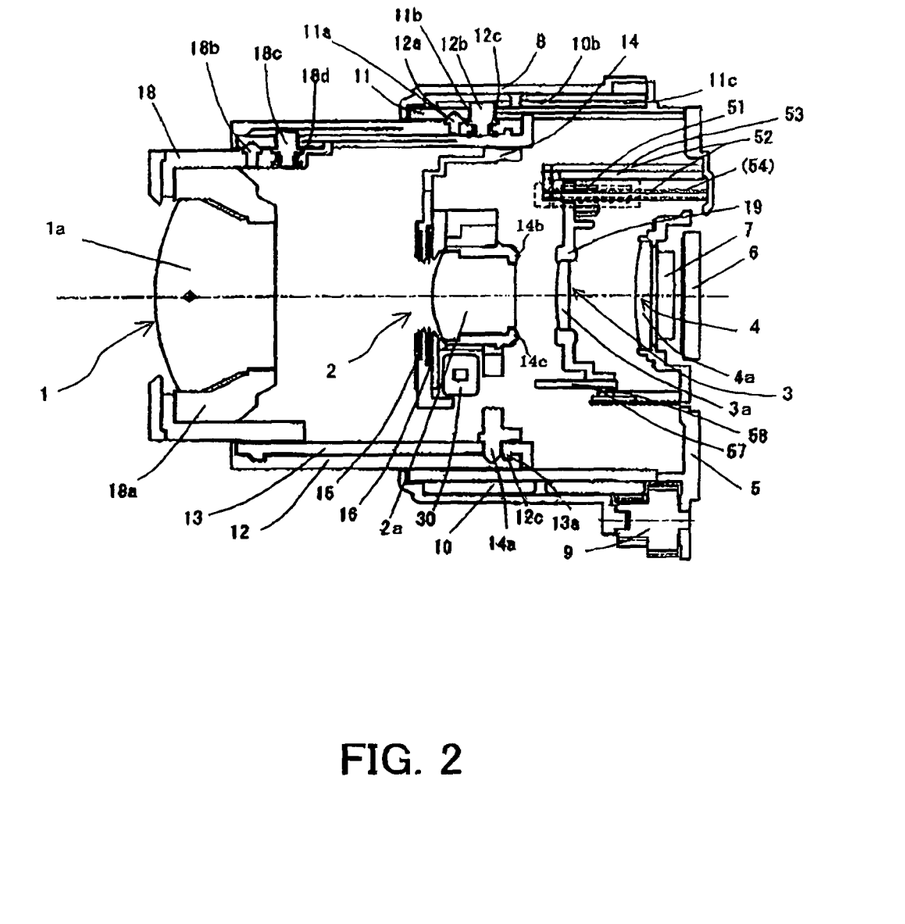
FIG. 2 is a sectional view showing the structure of the lens barrel of the embodiment in an image-taking state.

FIG. 1 shows the structure of a lens barrel that is a lens apparatus of an embodiment of the present invention in a collapsed (housed) state. FIG. 2 shows the structure of the lens barrel in an image-taking state. This lens barrel 101 is provided integrally in an image-taking apparatus 100 such as a digital still camera and a video camera as shown in FIG. 11.

Figure 11:
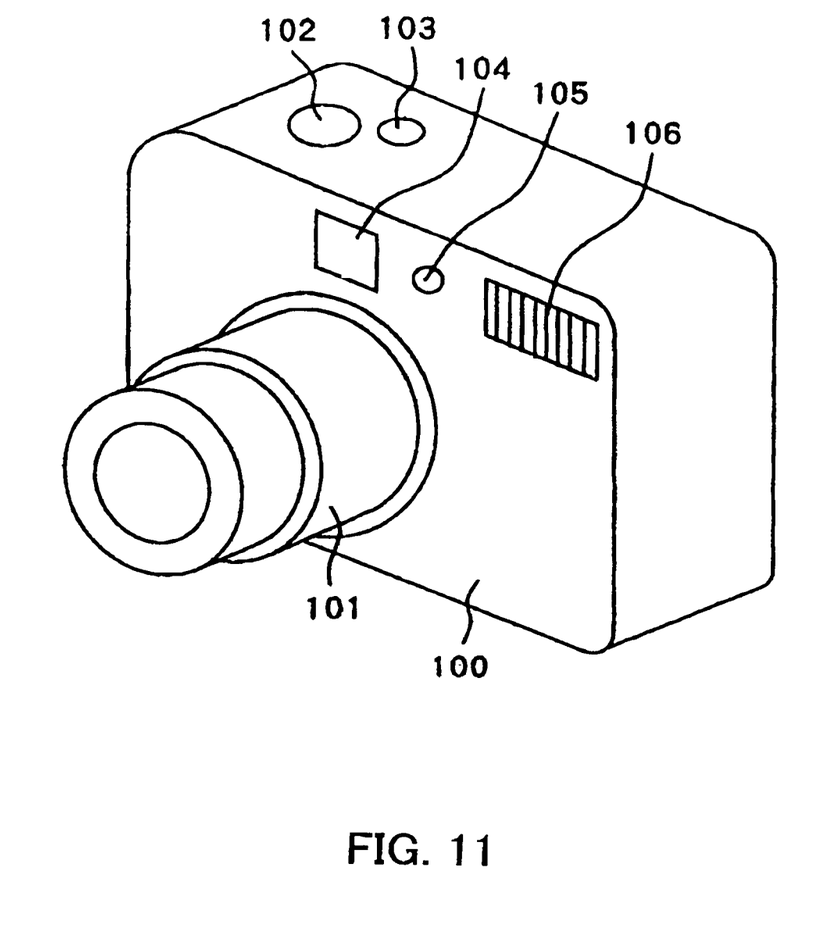
FIG. 11 is a perspective view of an image-taking apparatus equipped with the lens barrel of the embodiment.

In FIG. 11, reference numeral 102 denotes a shutter button, 103 a power on/off switch, 104 a finder window, 105 a photometry window, and 106 a flash unit.

As shown in FIGS. 1 and 2, the lens barrel of the present embodiment is a double-collapsible and four-unit lens barrel. The lens barrel includes, in order from an object side (left in the figure) to an image side, a front lens unit 1 comprising a compensator lens 1a held by a lens holding member 18a and a first holding barrel 18 holding the lens holding member 18a, a variator lens unit (second lens unit) 2 comprising a variator lens 2a and a second holding barrel 14 holding the variator lens 2a, a focusing lens unit (first lens unit) 3 comprising a focusing lens 3a and a third holding barrel 19 holding the focusing lens 3a, and a relay lens unit 4 comprising a relay lens 4a and a fourth holding barrel holding the relay lens 4a.

Reference numeral 6 denotes an image-pickup element such as a CCD sensor and a CMOS sensor. The image-pickup element photoelectrically converts an object image formed by the above-mentioned four lens units 1 to 4 to a electric signal. Reference numeral 5 denotes an element base member holding the image-pickup element 6.

Reference numeral 7 denotes an optical low-pass filter, 8 a cover barrel having a substantially cylindrical shape and being fixed with a screw to the element base member 5.

Reference numeral 9 denotes a driving gear engaging with a gear portion that is provided on the outer circumference of a driving barrel 10, and transmitting the rotational power of a zoom motor 20 to the driving barrel 10. The driving gear 9 is rotatably held by the cover barrel 8 and the element base member 5.

Inside the driving barrel 10, a fixed barrel 11 fixed to the cover barrel 8 and element base member 5 is arranged. Three taper cams 11a are formed on the fixed barrel 11 equiangularly. Moreover, three cams 11b having a through-groove shape are formed on the fixed barrel 11 equiangularly.

The driving barrel 10 has a cylindrical shape, and three straight grooves 10b extending in the optical axis direction are formed on the inner circumferential surface of the driving barrel 10 equiangularly. Moreover, a moving cam barrel 12 is arranged inside the fixed barrel 11. The moving cam barrel 12 has a cylindrical shape, and three follower pins 12a that are cam followers are provided on the outer circumferential surface of the moving cam barrel 12 equiangularly. Furthermore, three driving pins 12b are fixed with nuts 12c on the outer circumferential surface of the moving cam barrel 12 equiangularly. The driving pins 12b are located at positions on the image-plane side further than the follower pins 12a.

The follower pin 12a has a taper portion on its tip, the taper portion engaging with the taper cam 11a. The driving pin 12b engages with the cam 11b, and penetrates it to engage with the straight groove 10b.

When the driving barrel 10 is rotated around the optical axis of the lens barrel by the driving power from the zoom motor 20, the moving cam barrel 12 rotates around the optical axis with the driving barrel 10 because of the engagement of the driving pin 12b and straight groove 10b. At this time, since the follower pin 12a of the moving cam barrel 12 engages with the cam 11b of the fixed barrel 11, the moving cam barrel 12 is moved in the optical axis direction by the lift of the taper cam 11a.

A straight-proceeding barrel 13 is arranged inside the moving cam barrel 12. The straight-proceeding barrel 13 has a cylindrical shape, and three protruding portions 13e are formed in the rear end on the outer circumferential surface of the straight-proceeding barrel 13 equiangularly. The three protruding portions 13e engage with three straight grooves 11c that are formed on the inner circumferential surface of the fixed barrel 11 equiangularly so as to extend in the optical axis direction. Therefore, the straight-proceeding barrel 13 is movable with respect to the fixed barrel 11 in the optical axis direction, but its rotation around the optical axis is prevented.

Three protruding portions 13a are formed in the vicinity of the rear end on the outer circumferential surface of the straight-proceeding barrel 13 equiangularly. The protruding portion 13a engages with a groove 12c formed on the inner circumferential surface of the moving cam barrel 12 so as to extend in the circumferential direction. Therefore, the movement of the moving cam barrel 12 in the optical axis direction moves the straight-proceeding barrel 13 in the same direction. At this time, the moving cam barrel 12 rotates, but the straight-proceeding barrel 13 does not rotate.

Three straight grooves 13b extending in the optical axis direction and having a through-groove shape are formed in the straight-proceeding barrel 13 equiangularly. Moreover, three taper cams 12d are formed on the inner circumferential surface of the moving cam barrel 12 equiangularly.

Furthermore, three follower pins 14a are provided on the outer circumferential surface of the second holding barrel 14 equiangularly. The follower pin 14a penetrates the straight groove 13b and engages with the taper cam 12d at a taper portion formed at its tip. Therefore. the second holding barrel 14 is moved by the lift of the taper cam 12d in the optical axis direction in synchronization with the movement in the optical axis direction and rotation of the moving cam barrel 12.

The second holding barrel 14 holds the variator lens unit 2a, a shutter unit 15 and a stop unit 16. Hereinafter, these are collectively referred to as the second lens unit, and the detailed explanation thereof will be given later.

Three taper cams 13c having a through-groove shape are formed at the front portion of the straight-proceeding barrel 13 equiangularly. Moreover, three cams 13d are formed at the front portion on the inner circumferential surface of the straight-proceeding barrel 13 equiangularly.

The first holding barrel 18 is arranged inside the straight-proceeding barrel 13. Furthermore, three straight grooves 12e extending in the optical axis direction are formed at the front portion on the inner circumferential surface of the moving cam barrel 12 equiangularly. Inside the first holding barrel 18, the lens holding member 18a is joined with the first holding barrel 18; the lens holding member 18a holds the compensator lens 1a.

Three follower pins 18b that are cam followers are provided on the outer circumferential surface of the first holding barrel 18 equiangularly, and three driving pins 18c are fixed with nuts 18d to the first holding barrel 18 equiangularly.

A taper portion formed at the tip of the follower pins 18b engages with the taper cam 13c. The driving pin 18c penetrates the cam 13d formed in the straight-proceeding barrel 13 and engages with a straight groove 12e formed on the inner circumferential surface of in the moving cam barrel 12 and extending in the optical axis direction. Thereby, when the moving cam barrel 12 is rotated, the first holding barrel 18 is rotated around and moved in the optical axis direction by the lift of the taper cam 13c of the straight-proceeding barrel 13.

By the structure described above, the lens barrel is driven so as to change its whole length between the collapsed state shown in FIG. 1 and the image-taking state shown in FIG. 2. Zooming is preformed by the change of the distances in the optical axis direction of the four lens units by the driving power of the zoom motor 20. Focusing is preformed by the change of the position in the optical axis direction of the third holding barrel 19 (focusing lens 3a) by the driving power of the voicecoil motor that will be described later.

Control of energization for the zoom motor 20 and voicecoil motor (coil 51), that is, control of the positions of the second lens unit 2 and third lens unit 3 is performed by a controller 70 shown in FIG. 1.

Figure 3:
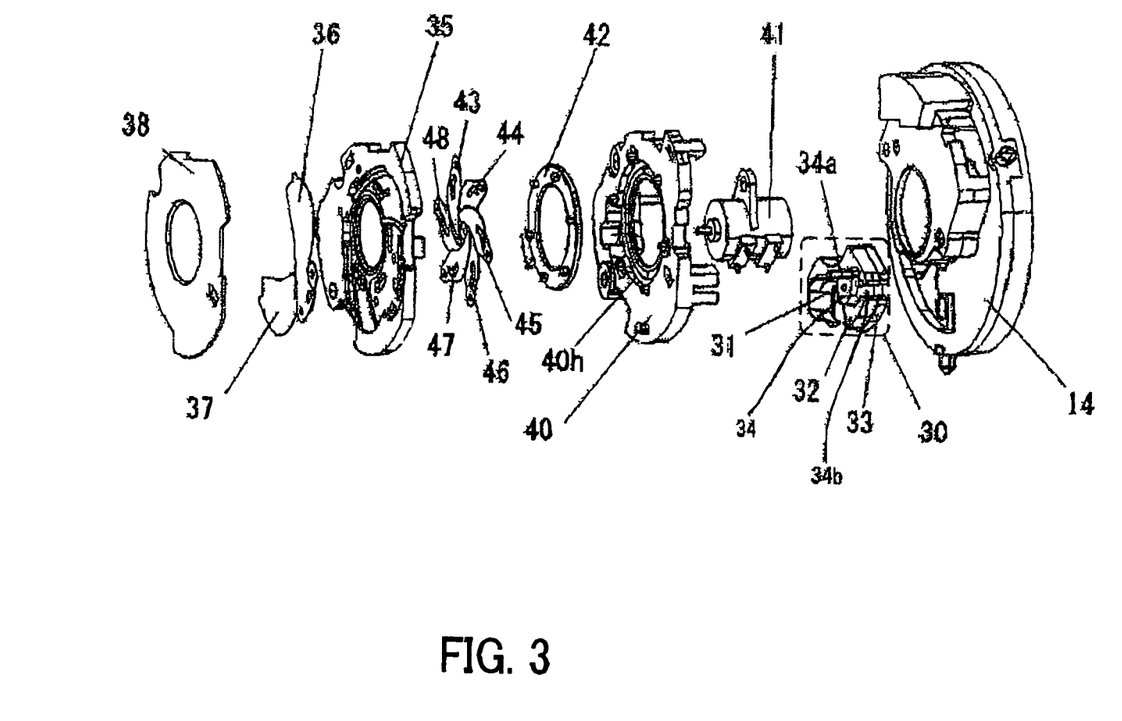
FIG. 3 is an exploded perspective view of a second lens unit in the lens barrel of the embodiment.

Next, the second lens unit 2 will be explained using FIGS. 3 to 5. In FIG. 3, reference numeral 30 denotes a driving source of the shutter unit 15. The driving source 30 comprises a coil 31 wound around a bobbin. Magnetic flux generated by the energization to the coil 31 passes through yokes 32 and 33, and generates magnetic torque in a magnet 34b integrally provided on an arm 34. The rotation angle of the arm 34 is limited by the contact between a pin 34a formed on the arm 34 and the ends of an opening 35a formed in a shutter base member 35.

Figure 4:
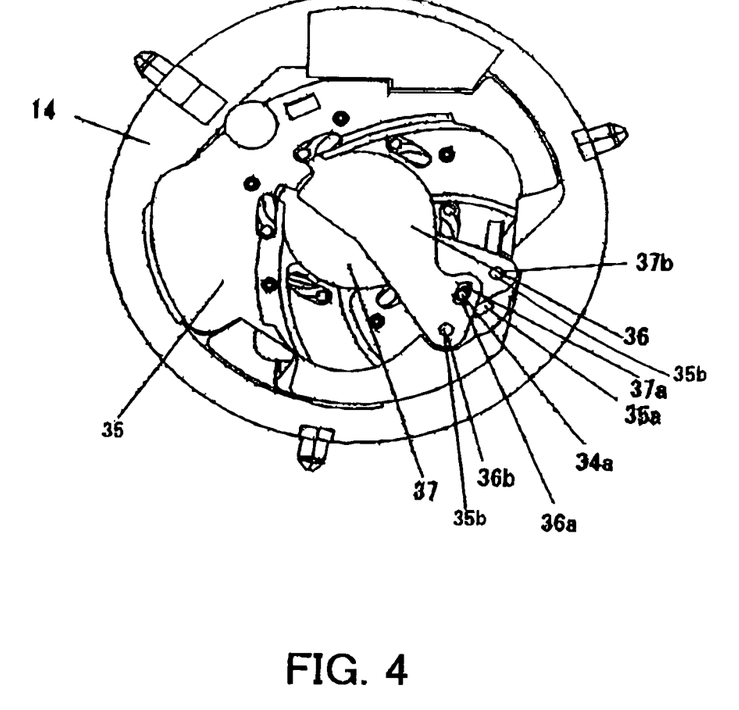
FIG. 4 is a front view of a shutter unit in the lens barrel of the embodiment in an opened state.
Figure 5:
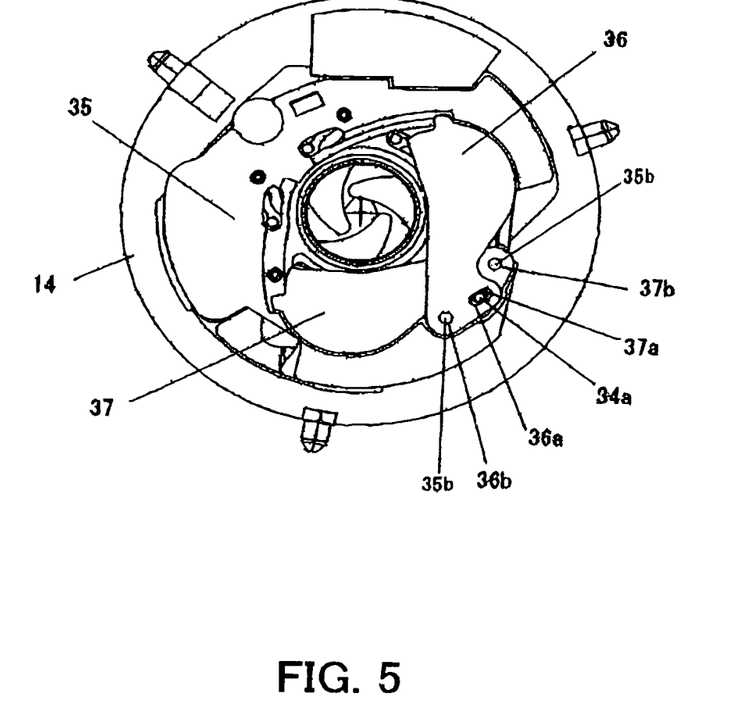
FIG. 5 is a front view of a shutter unit in the lens barrel of the embodiment in a closed state.

The pin 34a is inserted into openings 36a and 37a respectively formed in two shutter blades 36 and 37 as shown in FIGS. 4 and 5. Therefore, when the arm 34 is rotated, the shutter blades 36 and 37 are rotated in their open/close direction along rails formed on the shutter base member 35 by the driving power received at the openings 36a and 37a from the pin 34a. A pin 35b formed on the shutter base member 35 is inserted into openings 36b and 37b respectively formed in the shutter blades 36 and 37. The pin 35b becomes the rotation center of the shutter blades 36 and 37; the shutter blades 36 and 37 rotate between the open state shown in FIG. 4 and the close state shown in FIG. 5.

In the states shown in FIGS. 4 and 5, the magnet 34b stops at the rotation position where a magnetic attracting force acts between its magnetic poles and the yokes 32 and 33. Therefore, the shutter blades 36 and 37 are held in each state after stopping the energization to the coil 51.

In FIG. 3, reference numeral 38 denotes a shutter top board holding the shutter blades 36 and 37 so that they may not drop out of the shutter base member 35.

Next, the stop unit 16 will be explained using FIGS. 3, 6 and 7. The stop unit 16 in this embodiment is an iris stop having six stop blades. A stop base member 40 is provided on the object side of the second holding barrel 14. A stepping motor 41 for driving the stop blades is fixed to the stop base member 40. A gear 41a attached to the output shaft of the stepping motor 41 protrudes from a hole 40a formed in the stop base member 40. The gear 41a engages with a gear 42a provided on the outer circumferential portion of the stop-driving ring 42.

Six pins 42b, 42c, 42d, 42e, 42f and 42g are formed on the object-side surface of the stop-driving ring 42. These pins 42b to 42g engage with cam grooves formed in the stop blades 43, 44, 45, 46, 47 and 48, respectively. On the other hand, six pins 40b, 40c, 40d, 40e, 40f and 40g are formed on the object-side surface of the stop base member 40. These pins 40b to 40g are inserted into holds formed in the stop blades 43 to 48, respectively.

Figure 6:
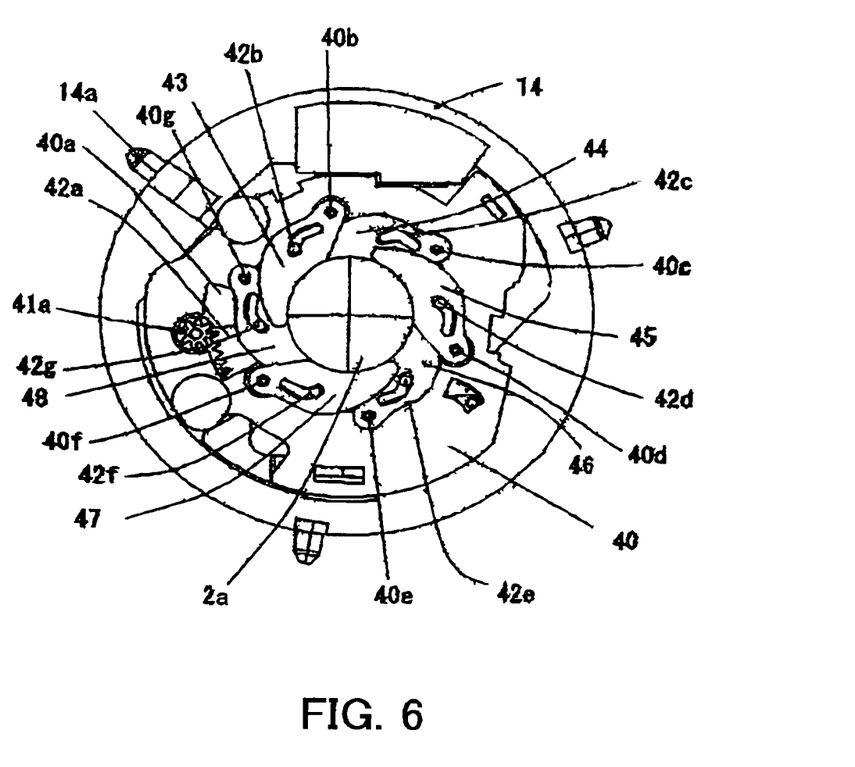
FIG. 6 is a front view of a stop unit in the lens barrel of the embodiment in an opened state.
Figure 7:
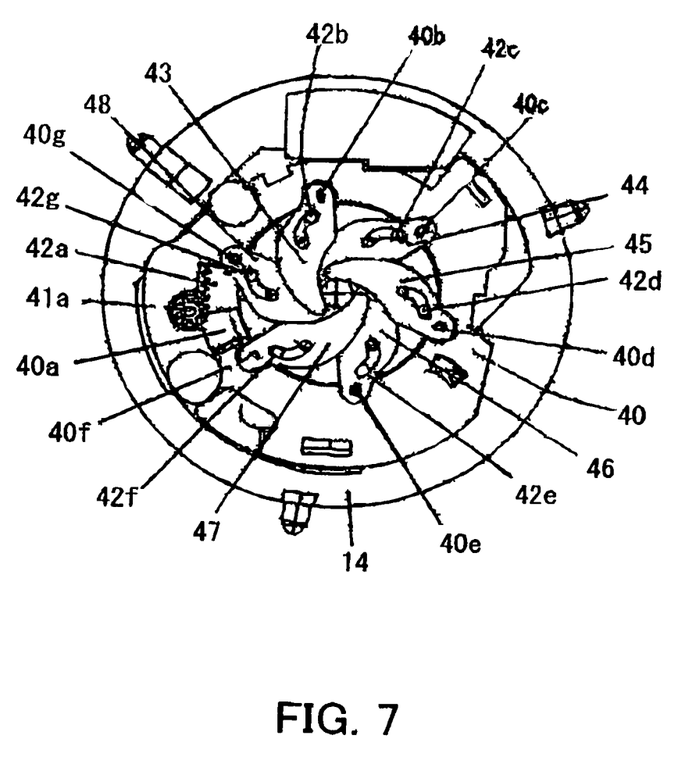
FIG. 7 is a front view of the stop unit in a small aperture state.

FIG. 6 shows the stop unit 16 in the open state, and FIG. 7 shows the stop unit 16 in a small aperture state. The rotation of the stepping motor 41 rotates the stop-driving ring 42, which is arranged in a concave portion 40h (see FIG. 3) formed around an aperture (light-passing opening) that is formed at the center of the stop base member 40 The gear 42a of the stop-driving ring 42 has a circular arc shape; the rotation amount of the stop-driving ring 42 is limited by a circular arc hole 40a formed in the stop base member 40.

The stop-driving ring 42 is rotated according to the step-rotating angle of the stepping motor 41, and the six stop blades 43 to 48 are rotated in the open/close direction around the pins 40b to 40g along the cam grooves thereof, respectively. Thereby, the area of the stop aperture formed by the six stop blades 43 to 48 is changed.

Next, the structure of the third lens unit 3 including the focusing lens 3a and third holding barrel 19, and a driving mechanism thereof for focusing will be explained.

Figure 8:
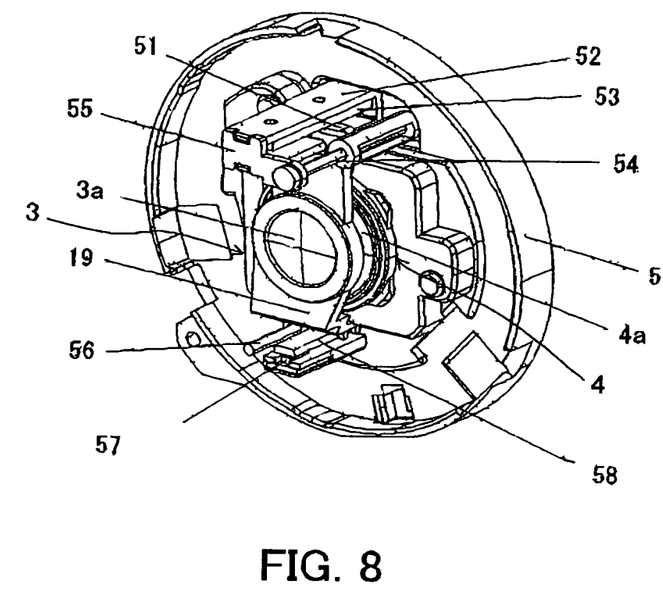
FIG. 8 is a perspective view of a third lens unit and a base member for an image-pickup element in the lens barrel of the embodiment.
Figure 9:
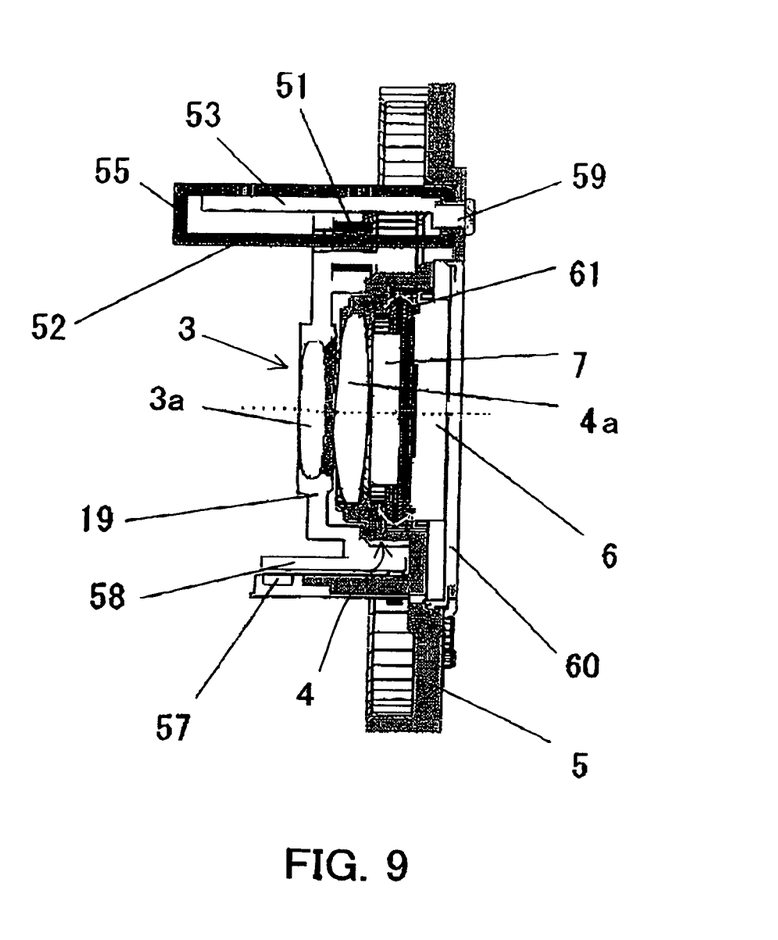
FIG. 9 is a sectional view of the third lens unit and the base member.

FIGS. 8 and 9 show the third lens unit 3 and the element base member 5. As shown in the figures, the third holding barrel 19 holds the focusing lens 3a. A coil 51, yoke 52 and permanent magnet 53 constitute the voicecoil motor.

Reference numeral 54 denotes a first guide bar guiding the third holding barrel 19 in the optical axis direction, and 55 a metal member for fixing the yoke 52 and first guide bar 54. Reference numeral 56 denotes a second guide bar restraining the rotation of the third holding barrel 19 in a plane orthogonal to the optical axis direction.

The principal of the drive of the voicecoil motor in the present embodiment is the same as that of well-known voicecoil motors. The coil 51 is wound around the third holding barrel 19 so as to encircle the yoke 52. The permanent magnet 53 is magnetized in the optical axis direction. The magnetic flux from the permanent magnet 53 is generated radially with respect to the optical axis from the outside of the yoke 52 to the inside thereof; the direction of the magnetic flux is orthogonal to the winding direction of the coil 51.

Therefore, when applying a current to the coil 51, the third holding barrel 19 receives a driving power in the optical axis direction, and is moved along the first and second guide bars 54 and 56. Moreover, the change of the direction of the current applied to the coil 51 switches the moving direction of the third holding barrel 19.

The controller 70 detects the movement amount of the third holding barrel 19 by the following detecting structure that is used a magnetic sensor 57. In bottom portion of the third holding barrel 19 in FIGS. 8 and 9, a magnetic scale 58 is provided. North poles and south poles are alternately magnetized at a predetermined pitch in the magnetic scale 58. The magnetic sensor 57 that faces the magnet scale 58 with a predetermined gap is provided on the element base member 5. The length of the magnetic scale 58 is set so as to be able to face the magnetic sensor 57 in the whole moving range of the third holding barrel 19 for focusing.

The magnetic sensor 17 outputs a signal with a near-sinusoidal waveform according to the movement of the magnetic scale 58 with the movement of the third holding barrel 19. The controller 70 shapes the signal into a pulse signal, and counts the number of its pulse to detect the movement amount of the third holding barrel 19. The detection of the movement amount is always performed after the power of the image-taking apparatus is turned on.

The controller 70 controls the drive of the third holding barrel 19 for focusing by controlling the amount and direction of the current applied to the coil 51. The control is performed so that the detected movement amount may become substantially equal to a target movement amount that is stored in a memory (not shown in the figure) or calculated for a predetermined reference position. In other words, the control is performed so that the detected movement amount may become equal to the target movement amount or fall in a permissible range for the target movement amount, in which there is no influence on focusing. A method for setting the above-mentioned reference position will be explained later.

Figure 10:
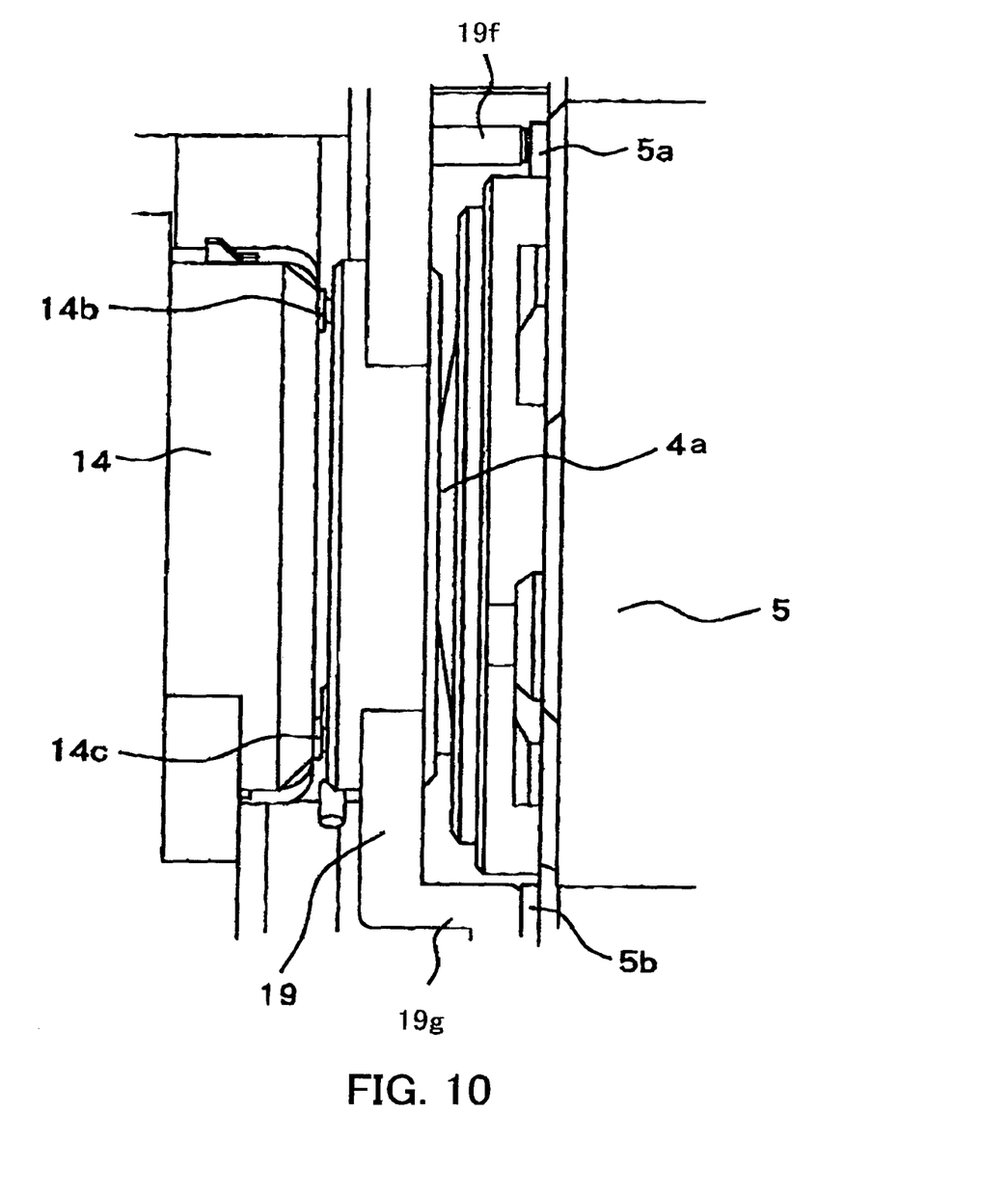
FIG. 10 is a partially sectional view of the third lens unit and the base member in FIG. 9.

Next, the operation of the third holding barrel 19 at the time of the collapsing operation of the lens barrel will be explained using FIGS. 1, 2 and 10. When the power is turned off in the image-taking state shown in FIG. 2, the zoom motor 20 rotates in a direction in which the lens barrel will be collapsed. Thereby, the first holding barrel 18 and second holding barrel 14 are moved toward the image-pickup element 6.

Here, in the image-taking state, the coil 51 of the voicecoil motor that drives the third holding barrel 19 is always energized for holding the position of the third holding barrel 19. However, the energization to the coil 51 (voicecoil motor) is stopped after the power is turned off. This saves the power of the image-taking apparatus.

However, since the voicecoil motor has no stable stop position in the nonenergized state as described above, the third holding barrel 19 can move freely in the optical axis direction after the energization to the coil 51 is stopped.

To solve the problem, in the present embodiment, impact absorption members 14b and 14c, which are made of elastic material such as rubber, are provided at the image-plane side portion of the second holding barrel 14.

When the second holding barrel 14 is moved toward the image-pickup element 6 by the driving power of the zoom motor 20, the impact absorption members 14b and 14c contact the object-side surface of the third holding barrel 19 to push and move the third holding barrel 19. Moreover, when each of the second and third holding barrel 14 and 18 reaches the collapsed position, stoppers 19f and 19g formed at the image-plane side portion of the third holding barrel 19 contact stoppers 5a and 5b formed on the element base member 5, respectively. As a result, the third holding barrel 14 is pressed against the element base member 5; thereby the position of the third holding barrel 14 is held.

As described above, in this embodiment, the third holding barrel 19 that becomes movable freely after the energization to the voicecoil motor is stopped is driven by the second holding barrel 14 that is driven to the collapsed position. Moreover, the third holding barrel 19 is held by sandwiching it between the second holding barrel 14 and the element base member 5 after reaching the collapsed position, thereby stopping free movement of the third holding barrel 19. As a result, it is possible to avoid a problem that deterioration of the optical accuracy of the lens barrel and a collision sound will occur because of the collision between the third holding barrel 19 movable freely and the second holding barrel 14 or element base member 5.

In other words, in the nonenergized state of the first actuator, it is possible to control the position of the first lens unit by using the driving power of the second lens unit. Therefore, unintended movement of the first lens unit and collision of the first lens unit and a mechanical end of the movable range are prevented in the nonenergized state of the first actuator. In addition, driving the second actuator with stopping the energization to the first actuator makes it possible to save the power.

Here, it is possible to set the third holding barrel 19 to a predetermined position (collapsed position) in the optical axis direction with little play by providing the impact absorption members 14b and 14c on portions that contact the third holding barrel 19 in the second holding barrel 14, and by raising the accuracy of the distance from the image-pickup element 6 to the stoppers 5a and 5b provided on the element base member 5 to some extent.

Therefore, if a movement-amount-counter counting the number of pulses in the controller 70 is reset when the power is turned on, it is possible to set this position to the reference position for controlling the movement amount (position) of the third holding barrel 19.

As a result, the accuracy for driving the third holding barrel 19 to an optimal focus position corresponding to the above-described target movement amount according to an object distance obtained by distance measurement is guaranteed every time the power is turned off. Therefore, resetting the movement-amount-counter every power-off makes it possible to eliminate the necessity of a reset operation at the time of power-on and a sensor for detecting the reference position. Thereby, it is possible to achieve the miniaturization of the image-taking apparatus and the simplification of lens control.

In the above-described embodiment, the focusing lens unit driven by the voicecoil motor originally is driven by the variator lens unit that is driven by the zoom motor in the nonenergized state of the voicecoil motor. However, the present invention can be applied to any case where a first lens unit driven by a voicecoil motor originally is driven by a second lens unit that is driven by another actuator in the nonenergized state of the voicecoil motor.

In addition, in the above-described embodiment, the voicecoil motor was explained as an actuator having no stable stop position in its nonenergized state. However, the present invention can be applied to any case where an actuator other than a voicecoil motor and having no stable stop position in its nonenergized state is used.

This application claims priority from Japanese Patent Application No. 2004-083736, filed on Mar. 22, 2004, which is hereby incorporated by reference herein.

What is claimed is:

1. An image-taking apparatus including a lens apparatus which is operable between a housed state and an image-taking state, comprising:
   a first member configured to hold a first lens unit and to be movable in an optical axis direction;
   a second member configured to be located on an object side further than the first member and to be movable in the optical axis direction, wherein the second member has an aperture unit on the object side;
   a first actuator configured to move the first member during the image-taking state, the first actuator being a voice-coil motor;
   a second actuator configured to move the second member; and
   a controller configured to control the first actuator and the second actuator, wherein the controller has a retraction mode to transit to the housed state from the image-taking state,
   wherein, depending on a transition to the retraction mode, the first actuator is brought into a nonenergized state and the first actuator does not move the first member, the second member moved by the second actuator comes into contact with the first member at a side of the second member opposite to the side where there is the aperture unit, and the second member moved by the second actuator shoves on the first member in the optical axis direction.

2. The image-taking apparatus according to claim 1 wherein, in the process of changing the lens apparatus from the image-taking state to the housed state the first and second members are moved to a housed position where the first and second members are housed in the housed state, the housed position being closer to an image plane than an image-taking position where the first and second members are located in the image-taking state.

3. The image-taking apparatus according to claim 1, wherein the first actuator has no stable stop position in the nonenergized state.

4. The image-taking apparatus according to claim 1, wherein the first and second members are moved to a housed position where the first and second members are housed in the housed state, and the first member that has been moved to the housed position is held at the housed position by the second member and an elastic member located between the first and second members.

5. The image-taking apparatus according to claim 1, further comprising:
   a detector configured to output a signal according to a movement of the first member; and
   a controller configured to detect a movement amount of the first member based on the signal from the detector, and configured to control drive of the first actuator so that the detected movement amount may be substantially equal to a target movement amount,
   wherein the controller is configured to reset the detected movement amount at the housed position.

6. An image-taking apparatus comprising:
   the lens apparatus according to claim 1; and
   an image-pickup element, which photoelectrically converts an object image formed by the lens apparatus.

* * * * *